United States Patent
Tzu et al.

(10) Patent No.: US 12,292,032 B2
(45) Date of Patent: May 6, 2025

(54) OFFSHORE WIND TURBINE WITH ANTI-ACCUMULATION OF AQUATIC ORGANISMS

(71) Applicant: National Kaohsiung University of Science and Technology, Kaohsiung (TW)

(72) Inventors: Fu-Ming Tzu, Kaohsiung (TW); Chih-Yung Hsu, Kaohsiung (TW)

(73) Assignee: NATIONAL KAOHSIUNG UNIVERSITY OF SCIENCE AND TECHNOLOGY, Kaohsiung (TW)

( * ) Notice: Subject to any disclaimer, the term of this patent is extended or adjusted under 35 U.S.C. 154(b) by 0 days.

(21) Appl. No.: 18/237,575

(22) Filed: Aug. 24, 2023

(65) Prior Publication Data
US 2024/0125299 A1    Apr. 18, 2024

(30) Foreign Application Priority Data
Oct. 18, 2022    (TW) .................................. 111139375

(51) Int. Cl.
F03D 80/00    (2016.01)
F03D 80/50    (2016.01)

(52) U.S. Cl.
CPC ............ *F03D 80/003* (2023.08); *F03D 80/50* (2016.05); *F05B 2240/85* (2020.08); *F05B 2240/95* (2013.01)

(58) Field of Classification Search
CPC .......... F03D 9/11; F03D 80/003; F03D 80/50; F03D 80/00; F03D 13/25; F05B 2240/85; F05B 2240/95; Y02E 10/72
See application file for complete search history.

(56) References Cited

U.S. PATENT DOCUMENTS

| | | | | |
|---|---|---|---|---|
| 5,088,432 A | * | 2/1992 | Usami | B63B 59/04 114/67 R |
| 5,820,737 A | * | 10/1998 | Kohn | B63B 59/04 205/730 |
| 7,025,013 B1 | * | 4/2006 | Staerzl | B63B 59/04 114/222 |
| 2012/0299376 A1 | * | 11/2012 | Schaefer | F03D 13/22 320/101 |

* cited by examiner

*Primary Examiner* — Julio C. Gonzalez
(74) *Attorney, Agent, or Firm* — WPAT, PC

(57) ABSTRACT

An offshore wind turbine with anti-accumulation of aquatic organisms, comprising: a base with an interior space, the base being made of conductive material; a tower incorporated above the base; a nacelle, connected to the tower; a plurality of blades, each interconnected with the nacelle; and a power supply system electrically connected to the base and disposed within the interior space, the power supply system being used to provide electrical energy to the base to energize the surface of the base to form an electric field.

6 Claims, 5 Drawing Sheets

[FIG. 1]
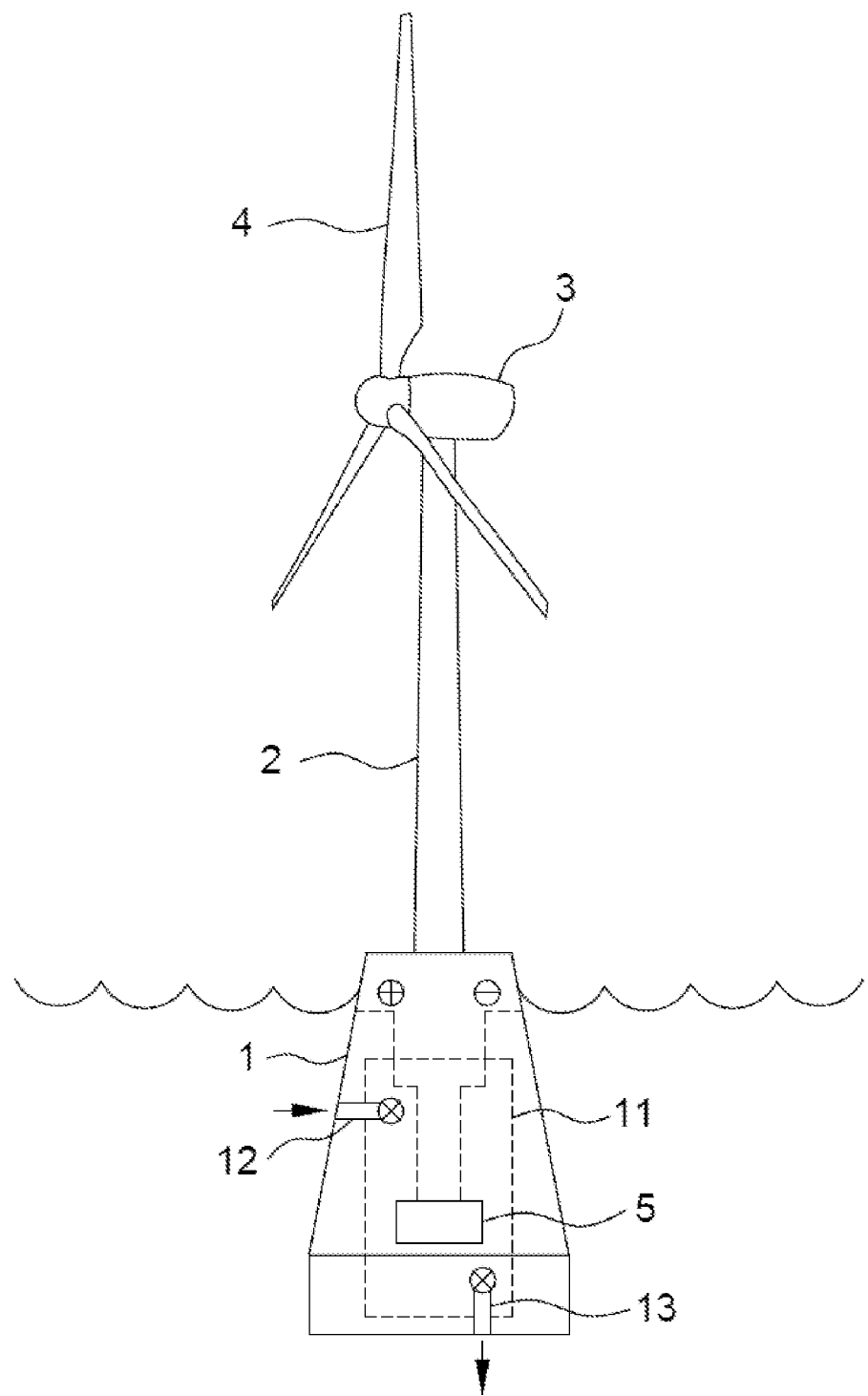

[FIG. 2]
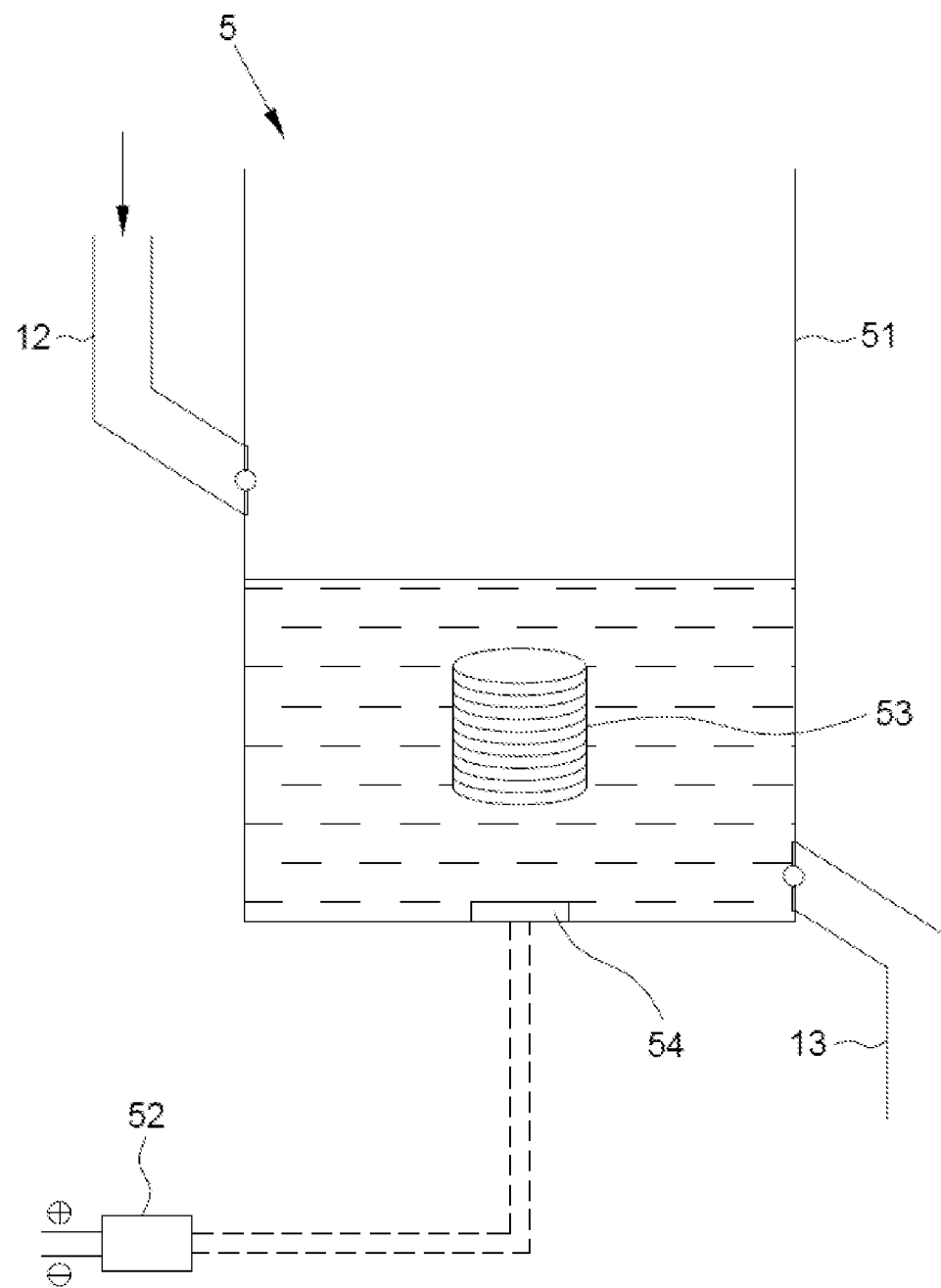

[FIG.3]
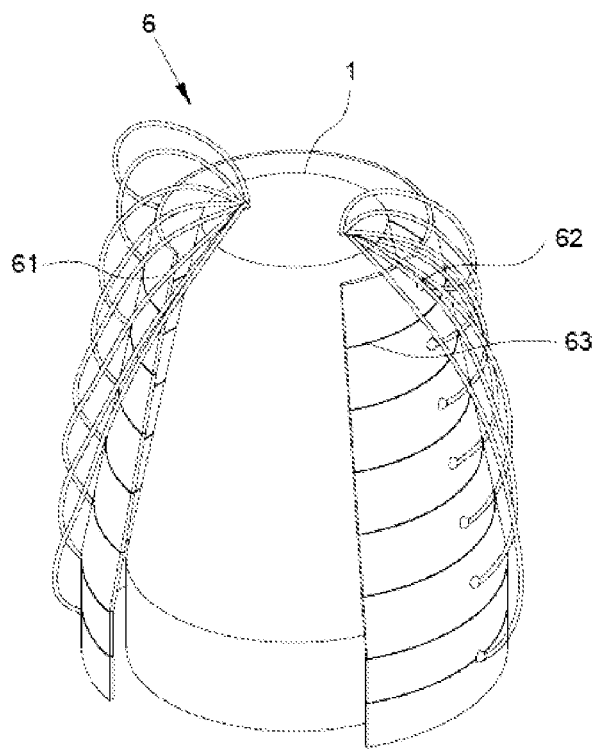

[FIG. 4]
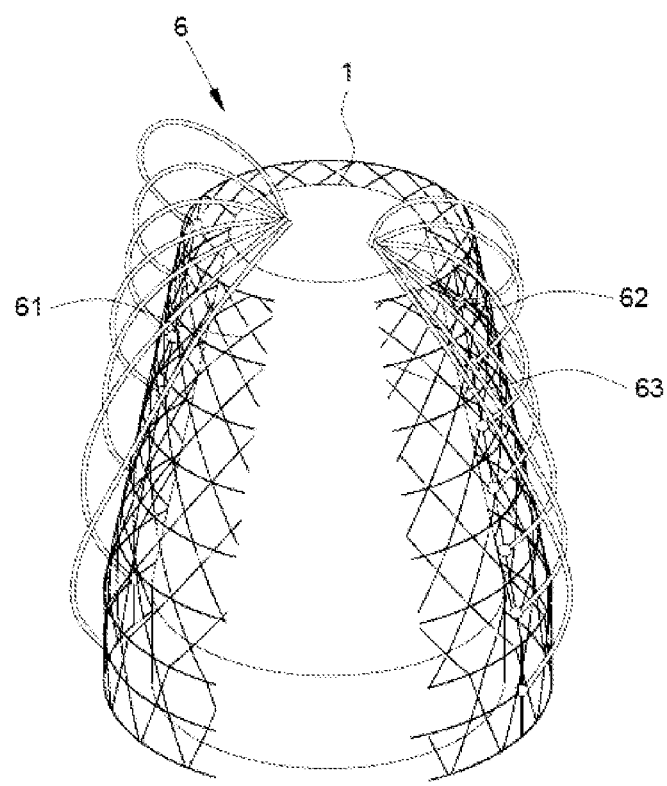

[FIG. 5]
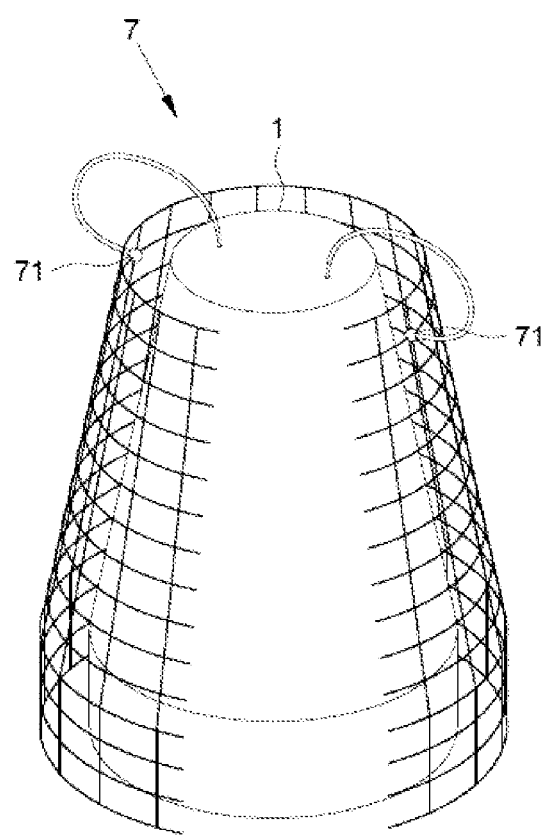

OFFSHORE WIND TURBINE WITH ANTI-ACCUMULATION OF AQUATIC ORGANISMS

CROSS-REFERENCE TO RELATED APPLICATION

This application claims the benefit of Taiwan Patent Application No. 111139375, filed on Oct. 18, 2022, which is hereby incorporated by reference for all purposes as if fully set forth herein.

BACKGROUND

Technical Field

The present invention focuses on an offshore wind turbine with anti-accumulation of aquatic organisms, and in particular on an offshore wind turbine with anti-accumulation of aquatic organisms by generating an electrical current on the outside of a base.

Related Art

The structure of an offshore wind turbine consists of an operating structure located above the seawater surface and a supporting structure, a pile or a base located below the seawater surface. In particular, the part of the offshore wind turbine located below the surface of the seawater often has various kinds of oysters, curly shells, rattan pots or other aquatic organisms attached to it, and these aquatic organisms are likely to cause a reduction in the lifespan of the offshore wind turbine. Therefore, in order to prevent such aquatic organisms from accumulating on the offshore wind turbine, it has been known to remove the aquatic organisms by applying a coating containing cuprous oxide or organic tin to the surface of the offshore wind turbine, so as to solve the problem of such aquatic organisms accumulating on the offshore wind turbine.

However, the coatings used in the above known method of removing aquatic organisms contain cuprous oxide and organic tin that dissolve in seawater, and among them, the cuprous oxide even dissolves copper ions that cannot be decomposed and remain in the marine environment, thus causing pollution of the marine ecosystem.

In view of this, it is necessary to provide an offshore wind turbine that prevents aquatic organisms from accumulating in order to solve the above problem.

SUMMARY

The purpose of the present invention is to provide an offshore wind turbine with anti-accumulation of aquatic organisms by generating an electrical current on the outside of the base.

In order to achieve the above purpose, the present invention provides an offshore wind turbine with anti-accumulation of aquatic organisms, comprising: a base, having an internal storage space, the base being made of electrically conductive material; a tower, coupled to the base; a cabin, coupled to the tower; a plurality of blades, each coupled to the cabin; and a power supply system, electrically coupled to the base and disposed within the internal storage space, the power supply system being used to provide electrical energy to the base, so as to electrically energize a surface of the base to form an electric field.

The present invention also provides an offshore wind turbine with anti-accumulation of aquatic organisms, comprising: a base, having an internal storage space; an isolation assembly, surrounding the base; a tower, coupled above the base; a cabin, connected to the tower; several blades, connected to the cabin; and a power supply system, electrically coupled to the isolation component and disposed within the internal storage space, whereby the power supply system is used to provide electrical energy to the isolation component, so as to electrically energize the surface of the isolation component to form an electric field.

In some embodiments, the power supply system has a reaction chamber and a power collection unit, wherein the reaction chamber is interconnected with an inlet pipe of the base and contains a reactant and an electrode, wherein seawater is injected into the reaction chamber through the inlet pipe to produce an oxidation-reduction reaction together with the reactant and the electrode to generate electrical energy, wherein the power collection unit is electrically connected to the base and the electrode and is used for storing the electrical energy generated by the electrode and for supplying the electrical energy to the base. In this way, the reactor of the power supply system can be easily replenished with seawater, which has the effect of enhancing the supply rate of the power supply system.

In some embodiments, the isolation assembly has several conductive members stacked on top of each other, each of which has a surface made of a conductive material and has two contacts, each of which is electrically connected to the positive and negative poles of the power supply system, and each of which is provided with an insulating member between the conductive members for blocking the flow of electric current between the neighboring two conductive members. In this way, it has the effect of reinforcing the conductivity and electric field strength of the surface of the isolation member through seawater, and avoiding direct contact between aquatic organisms and the base.

In some embodiments, each of the conductive members is a ring-shaped sheet.

In some embodiments, each of the conductive members is a ring-shaped cross grid.

In some embodiments, the isolation assembly is a grid-like protective net having two contacts, the two contacts of the protective net being electrically connected to the positive and negative poles of the power supply system. This has the effect of enhancing the conductivity and electric field strength of the surface of the isolation member through seawater, and avoiding direct contact between aquatic organisms and the base.

In some embodiments, the power supply system has a reaction chamber and a power collection unit, wherein the reaction chamber is interconnected with an inlet pipe of the base and contains a reactant and an electrode, wherein seawater is injected into the reaction chamber through the inlet pipe to produce an oxidation-reduction reaction together with the reactant and the electrode to generate electrical energy, wherein the power collection unit is electrically connected to the isolation assembly and the electrode, and is used for storing the electrical energy generated by the electrode, and supplying the electrical energy to the isolation assembly. In this way, it is convenient to replenish seawater to the reaction chamber of the power supply system, which has the effect of enhancing the supply rate of the power supply system.

The offshore wind turbine with anti-accumulation of aquatic organisms of the present invention has the following features: the power supply system can be utilized to provide electrical energy to the base, so that the surface of the base is energized to form an electric field. The offshore fan of the present invention for preventing the accumulation of aquatic organisms can extend the service life of the offshore wind turbine by electrocuting the aquatic organisms accumulated on the surface of the base so that the aquatic organisms do not accumulate on the surface of the base due to the pain caused by the electrocution.

BRIEF DESCRIPTION OF THE DRAWINGS

FIG. 1 is a combination diagram of the first embodiment of the present invention;

FIG. 2 is an assembled view of the power supply system of the first embodiment of the present invention;

FIG. 3 is a three-dimensional diagram of the isolation assembly of the second embodiment of the present invention;

FIG. 4 is a three-dimensional view of the isolation assembly of the second embodiment of the present invention;

FIG. 5 is a three-dimensional view of the isolation assembly of the third embodiment of the present invention.

DETAILED DESCRIPTION

The embodiments of the present invention are described in detail as follows, the attached drawings are mainly simplified schematic drawings to illustrate the basic structure of the present invention in a schematic manner, and therefore only the components related to the present invention are labeled in the drawings, and the components shown are not drawn in terms of the number, shape, and size of the proportion of the implementation of the components, and the actual implementation of the specifications of the dimensions of the design is selective, and the layout of the components may be more complex.

The following examples are described with reference to additional drawings to exemplify particular embodiments in which the present invention may be practiced. Orientation terms such as "up", "down", "front", "back", etc. referred to in the present invention are only orientations with reference to the additional drawings. Accordingly, the directional terms used are intended to illustrate and understand the present application and are not intended to limit the application. Furthermore, in the specification, the word "comprising" will be understood to mean including the described components, but not excluding any other components, unless expressly described to the contrary.

Referring to FIG. 1, a first embodiment of an offshore wind turbine of the present invention for anti-accumulation of aquatic organisms comprises: a base 1, a tower 2, a nacelle 3, a plurality of blades 4, and a power supply system 5, wherein the tower 2 is incorporated above the base 1, the nacelle 3 is connected to the tower 2, the plurality of blades 4 are respectively connected with the nacelle 3, and the power supply system 5 is electrically connected to the base 1.

In this embodiment, the base 1 is located on the seabed and is made of a conductive material, which may be stainless steel but is not limited thereto. The base 1 has an interior space 11 which accommodates the power supply system 5.

The tower 2 is incorporated above the base 1 and is relatively above sea level when the offshore wind turbine of the present invention is set up on the seabed, i.e., seawater does not cover the tower 2 with high or low tides.

The nacelle 3 is combined at one end of the tower 2 away from the base 1 and is interconnected with the several blades 4, the nacelle 3 is used to accommodate the generator and part of the electromechanical control system, the plurality of blades 4 rotate around the shaft under the action of the aerodynamic force in order to convert the wind energy into the mechanical energy, and then drive the generator to produce the electrical energy, which is the common knowledge in the field of the present invention, and it will not be further elaborated herein.

The power supply system 5 is electrically connected to the base 1 and is disposed inside the interior space 11. The power supply system 5 is used to provide electrical energy to the base 1 to energize the surface of the base 1 to form an electric field to prevent aquatic organisms from accumulating to the surface of the base 1 by means of electric shock.

Referring to FIG. 2, the power supply system 5 may be a battery system with a reaction chamber 51 and a power collection unit 52, wherein the reaction chamber 51 is interconnected with an inlet pipe 12 of the base 1 and contains a reactant 53 and an electrode 54, which in this embodiment the reactant 53 is a metallic magnesium or a metallic copper. Hereby, seawater can be injected into the reaction chamber 51 through the inlet pipe 12 to generate electrical energy through an oxidation-reduction reaction with the reactant 53 and the electrode 54.

The power collection unit 52 is electrically connected to the electrode 54 and is used to store the electrical energy generated by the electrode 54, and in this embodiment, the power collection unit 52 is electrically connected to the base 1 to provide that electrical energy to the base 1. The power collection unit 52 may, for example, be a storage battery, but is not limited to that.

Notably, the free end of the inlet pipe 12 is located below the sea level. Further, the base 1 may have an outlet pipe 13 that is interconnected with the chamber 51 and is used for the battery system to drain the seawater outside of the base 1.

Referring to FIG. 3, which is a second embodiment of the offshore fan of the present invention for preventing the attachment of aquatic organisms, in this embodiment, the base 1 need not be limited to be made of a conductive material, but can also be made of a non-conductive material. Further, it is possible to include an isolation assembly 6, which may be partially made of a conductive material. The isolation assembly 6 surrounds the base 1 and is electrically connected to the power supply system 5, whereby the power supply system 5 can provide electrical energy to the isolation assembly 6 to energize the surface of the isolation assembly 6 to form an electric field.

Notably, when that power supply system 5 is a battery system as described above, in this embodiment, that power collection unit 52 is electrically connected to that isolation assembly 6 to provide the electrical energy to that isolation assembly 6.

Referring to FIG. 4, in this embodiment, the isolation assembly 6 has several conductive members 61 stacked on top of each other, and the surface of each of the conductive members 61 is made of a conductive material and has two contacts 62, and the two contacts 62 of each of the conductive members 61 are electrically connected to positive and negative poles of the power collection unit 52 of the power supply system 5. The power supply system 5 can provide electrical energy to each of the conductive members 61, causing the surface of each of the conductive members 61 to be energized to form an electric field, and the conductivity of the surface of each of the conductive members 61 and the strength of the electric field can be strengthened by seawater.

Each of the conductive members 61 may be in the form of a ring-shaped sheet or a ring-shaped cross grid.

On the other hand, each of the conductive members 61 is provided with an insulating member 63, which is used to block the flow of electric current between two neighboring conductive members 61, for example, a rubber ring. Preferably, the power supply system 5 may control the energization of each of the conductive members 61 by setting the power collection unit 52. For example, the power supply system 5 may control the surface of the conductive members 61 closer to the sea level to be de-energized during low tide for resting seabirds such as seagulls, petrels and albatrosses.

Referring to FIG. 5, which is the third embodiment of the offshore wind turbine with anti-accumulation of aquatic organisms of the present invention, compared to the second embodiment, the isolation assembly 6 can be a grid-like protective net 7, which has two contacts 71 electrically connected to positive and negative poles of the power collection unit 52 of the power supply system 5, respectively, so that the power supply system 5 can provide electrical energy to the protective net 7, resulting in the formation of an electric field by energization of the protective net 7, and the conductivity of the protective net 7 and the strength of electric field can be enhanced by the seawater.

As described above, the offshore wind turbine with anti-accumulation of aquatic organisms of the present invention can utilize the power supply system to provide electrical energy to the base, so that the surface of the base is electrified to form an electric field. By doing so, the offshore wind turbine with anti-accumulation of aquatic organisms of the present invention may electrocuting the aquatic organisms that are accumulated on the surface of the base so that the aquatic organisms do not accumulate on the surface of the base due to the pain caused by the electrocution, which has the effect of increasing the service life of the offshore wind turbine.

The embodiments disclosed above are merely illustrative of the principles, features and effects of the present invention, and are not intended to limit the scope of implementation of the present invention, and any person skilled in the art may make modifications and changes to the embodiments without violating the spirit and scope of the present invention. Any equivalent changes and modifications accomplished by the use of the disclosure of this invention shall still be covered by the scope of the patent application hereinafter.

What is claimed is:

1. An offshore wind turbine with anti-accumulation of aquatic organisms, comprising:
   a base with an interior space, the base being made of conductive material;
   a tower incorporated above the base;
   a nacelle, connected to the tower;
   a plurality of blades, each interconnected with the nacelle; and
   a power supply system electrically connected to the base and disposed within the interior space, the power supply system being used to provide electrical energy to the base to energize the surface of the base to form an electric field, wherein the power supply system has a reaction chamber and a power collection unit, wherein the reaction chamber is interconnected with an inlet pipe of the base and contains a reactant and an electrode, wherein seawater is injected into the reaction chamber through the inlet pipe to produce an oxidation-reduction reaction together with the reactant and the electrode to generate electrical energy, wherein the power collection unit is electrically connected to the base and the electrode and is used for storing the electrical energy generated by the electrode and for supplying the electrical energy to the base.

2. An offshore wind turbine with anti-accumulation of aquatic organisms, comprising:
   a base with an interior space;
   an isolation assembly, which surrounds the base;
   a tower, incorporated above the base;
   a nacelle, connected to the tower;
   a plurality of blades, each interconnected with the nacelle; and
   a power supply system electrically connected to the isolation assembly and disposed within the interior space, the power supply system being used to provide electrical energy to the isolation assembly to energize the surface of the isolation assembly to form an electric field, wherein the power supply system has a reaction chamber and a power collection unit, wherein the reaction chamber is interconnected with an inlet pipe of the base and contains a reactant and an electrode, wherein seawater is injected into the reaction chamber through the inlet pipe to produce an oxidation-reduction reaction together with the reactant and the electrode to generate electrical energy, wherein the power collection unit is electrically connected to the isolation assembly and the electrode, and is used for storing the electrical energy generated by the electrode, and supplying the electrical energy to the isolation assembly.

3. The offshore wind turbine with anti-accumulation of aquatic organisms of claim 2, wherein the isolation assembly has several conductive members stacked on top of each other, each of which has a surface made of conductive material and has two contacts, each of which is electrically connected to the positive and negative poles of the power supply system, and each of which is provided with an insulating member for blocking the flow of electric current between the two neighboring conductive members.

4. The offshore wind turbine with anti-accumulation of aquatic organisms of claim 2, wherein each of the conductive members is in the form of a ring-shaped sheet.

5. The offshore wind turbine with anti-accumulation of aquatic organisms of claim 2, wherein each of the conductive members is in the form of a ring-shaped cross grid.

6. The offshore wind turbine with anti-accumulation of aquatic organisms of claim 2, wherein the isolation assembly is a grid-like protective net having two contacts, the two contacts of the protective net being electrically connected to the positive and negative poles of the power supply system.

* * * * *